(12) United States Patent
Nagy et al.

(10) Patent No.: US 9,247,581 B2
(45) Date of Patent: Jan. 26, 2016

(54) MULTIPLE-PROCESSOR WIRELESS MOBILE COMMUNICATION DEVICE

(71) Applicant: BlackBerry Limited, Waterloo (CA)

(72) Inventors: Thomas C. Nagy, Waterloo (CA); Christopher Pattenden, Waterloo (CA); Sean B. Simmons, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 47 days.

(21) Appl. No.: 14/064,245

(22) Filed: Oct. 28, 2013

(65) Prior Publication Data
US 2014/0057673 A1    Feb. 27, 2014

Related U.S. Application Data

(63) Continuation of application No. 11/603,800, filed on Nov. 22, 2006, now Pat. No. 8,582,583, which is a continuation of application No. 10/352,585, filed on Jan. 28, 2003, now Pat. No. 7,164,904.

(60) Provisional application No. 60/351,419, filed on Jan. 28, 2002.

(51) Int. Cl.
*H04L 29/08* (2006.01)
*H04W 88/06* (2009.01)
*H04B 1/00* (2006.01)
(Continued)

(52) U.S. Cl.
CPC .............. *H04W 88/06* (2013.01); *H04B 1/0003* (2013.01); *H04B 1/28* (2013.01); *H04M 1/72519* (2013.01)

(58) Field of Classification Search
CPC ....... H04W 88/06; H04B 1/0003; H04B 1/28; H04M 1/72519
See application file for complete search history.

(56) References Cited

U.S. PATENT DOCUMENTS

| 4,703,475 A | 10/1987 | Dretzka et al. |
| 4,882,765 A | 11/1989 | Maxwell et al. |
| 4,939,724 A | 7/1990 | Ebersole |

(Continued)

FOREIGN PATENT DOCUMENTS

WO    WO 0205513 A1 *  1/2002

OTHER PUBLICATIONS

McGregor, G.; "The PPP Internet Protocol Control Protocol (IPCP)"; RFC 1332; May 1992; 13 pages.

(Continued)

*Primary Examiner* — Ronald Eisner
(74) *Attorney, Agent, or Firm* — Conley Rose, P.C.; J. Robert Brown, Jr.

(57) ABSTRACT

A wireless mobile communication device includes a first processor configured to execute a software application and a second processor configured to manage wireless communication over a wireless network. The processors are located in the same communication device and configured for one of the processors to send data to the other processor under a protocol. In accordance with this protocol, if the sending processor does not receive a receipt acknowledgement for the sent data from the other processor before the end of a resend time period measured from when the data was sent, then the sending processor resends the data to the other processor after the end of the resend time period. However, the sending processor does receive the acknowledgement before the end of the resend time period, then the sending processor does not resend the data to the other processor.

18 Claims, 7 Drawing Sheets

(51) Int. Cl.
*H04B 1/28* (2006.01)
*H04M 1/725* (2006.01)

(56) References Cited

U.S. PATENT DOCUMENTS

| | | | |
|---|---|---|---|
| 5,682,142 A | 10/1997 | Loosmore et al. | |
| 5,809,432 A * | 9/1998 | Yamashita | 455/575.1 |
| 6,101,168 A * | 8/2000 | Chen et al. | 370/228 |
| 6,356,991 B1 | 3/2002 | Bauman et al. | |
| 6,430,164 B1 | 8/2002 | Jones et al. | |
| 6,487,690 B1 * | 11/2002 | Schuster et al. | 714/752 |
| 6,556,129 B1 * | 4/2003 | Katada | 340/7.51 |
| 6,662,025 B1 * | 12/2003 | Bond et al. | 455/565 |
| 6,694,471 B1 | 2/2004 | Sharp | |
| 6,697,983 B1 * | 2/2004 | Chintada et al. | 714/748 |
| 6,807,564 B1 | 10/2004 | Zellner et al. | |
| 6,880,070 B2 | 4/2005 | Gentieu et al. | |
| 7,013,419 B2 | 3/2006 | Kagan et al. | |
| 7,164,904 B2 * | 1/2007 | Nagy | H04B 1/0003 455/403 |
| 7,317,907 B2 * | 1/2008 | Linkert | G06Q 10/10 370/350 |
| 7,493,109 B2 | 2/2009 | Munje et al. | |
| 7,697,957 B2 * | 4/2010 | Pattenden | G06F 1/26 320/106 |
| 8,457,020 B2 * | 6/2013 | Smadi | H04W 28/26 370/277 |
| 8,463,186 B2 * | 6/2013 | Griffin | H04B 5/0062 340/568.1 |
| 8,509,808 B2 * | 8/2013 | Krutt | H04B 5/0056 455/41.1 |
| 8,582,583 B2 * | 11/2013 | Nagy | H04B 1/0003 370/389 |
| 8,670,799 B2 * | 3/2014 | Pattenden | G06F 1/26 320/106 |
| 8,750,795 B2 * | 6/2014 | Krutt | H04B 5/0056 455/41.1 |
| 8,761,689 B2 * | 6/2014 | Smadi | H04W 72/1215 370/335 |
| 2001/0034788 A1 | 10/2001 | McTernan et al. | |
| 2002/0012585 A1 | 1/2002 | Kalkunte et al. | |
| 2002/0049068 A1 | 4/2002 | Koo et al. | |
| 2002/0172198 A1 | 11/2002 | Kovacevic | |
| 2003/0002449 A1 * | 1/2003 | Rittle et al. | 370/277 |
| 2003/0018793 A1 | 1/2003 | Mora | |
| 2003/0063598 A1 | 4/2003 | Huo | |
| 2003/0067907 A1 | 4/2003 | Rezaiifar et al. | |
| 2003/0110435 A1 | 6/2003 | Wu et al. | |
| 2003/0114165 A1 | 6/2003 | Mills | |
| 2003/0117316 A1 | 6/2003 | Tischer | |
| 2003/0140296 A1 | 7/2003 | Odman | |
| 2003/0143973 A1 | 7/2003 | Nagy et al. | |
| 2004/0025018 A1 | 2/2004 | Haas et al. | |
| 2005/0153729 A1 | 7/2005 | Logan et al. | |
| 2005/0259687 A1 | 11/2005 | Abrol et al. | |
| 2006/0035685 A1 | 2/2006 | Janninck et al. | |
| 2007/0066275 A1 | 3/2007 | Nagy et al. | |
| 2008/0005261 A1 * | 1/2008 | Adams | G06Q 20/3563 709/217 |
| 2014/0243042 A1 * | 8/2014 | Smadi | H04W 88/06 455/553.1 |

OTHER PUBLICATIONS

Simpson, W.; "The Point-to-Point Protocol (PPP)"; RFC 1661; Jul. 1994; 49 pages.

Office Action dated Mar. 22, 2006; U.S. Appl. No. 10/352,585, filed Jan. 28, 2003; 23 pages.

Notice of Allowance dated Aug. 23, 2006; U.S. Appl. No. 10/352,585, filed Jan. 28, 2003; 8 pages.

Office Action dated Nov. 19, 2007; U.S. Appl. No. 11/603,800, filed Nov. 22, 2006; 9 pages.

Final Office Action dated Apr. 10, 2008; U.S. Appl. No. 11/603,800, filed Nov. 22, 2006; 8 pages.

Office Action dated Jul. 9, 2008; U.S. Appl. No. 11/603,800, filed Nov. 22, 2006; 6 pages.

Final Office Action dated Jan. 29, 2009; U.S. Appl. No. 11/603,800, filed Nov. 22, 2006; 9 pages.

Advisory Action dated Apr. 8, 2009; U.S. Appl. No. 11/603,800, filed Nov. 22, 2006; 6 pages.

Office Action dated Dec. 1, 2009; U.S. Appl. No. 11/603,800, filed Nov. 22, 2006; 9 pages.

Final Office Action dated Jun. 7, 2010; U.S. Appl. No. 11/603,800, filed Nov. 22, 2006; 11 pages.

Office Action dated Jan. 18, 2013; U.S. Appl. No. 11/603,800, filed Nov. 22, 2006; 15 pages.

Notice of Allowance dated Jul. 11, 2013; U.S. Appl. No. 11/603,800, filed Nov. 22, 2006; 10 pages.

* cited by examiner

MULTIPLE-PROCESSOR WIRELESS MOBILE COMMUNICATION DEVICE

CROSS-REFERENCE TO RELATED APPLICATION

This is a continuation of U.S. application Ser. No. 11/603,800, filed Nov. 22, 2006, which is a continuation of U.S. application Ser. No. 10/352,585, filed Jan. 28, 2003 (now U.S. Pat. No. 7,164,904), which claims the benefit of U.S. Provisional Application No. 60/351,419, filed Jan. 28, 2002, all the above applications hereby incorporated herein by reference.

BACKGROUND

1. Technical Field

This invention relates generally to wireless mobile communication devices and in particular to such a device with multiple processors.

2. Description of the State of the Art

In wireless mobile communication devices, referred to herein primarily as "mobile devices", a single processor typically handles all device functionality, including device software applications, data processing, and communication functions, for example. However, in order to operate on some modern wireless communication networks, a mobile device must include a particular processor or type of processor. For example, the iDEN™ communication network developed by Motorola is one such network that requires a particular mobile device processor.

This processor requirement may be met for new mobile devices by developing operating system software and software applications targeted to a required processor. For existing mobile devices for which operating systems and software applications have already been developed based on a different processor however, providing for mobile device operation on such a network while maintaining device functionality can be much more challenging. Mobile device manufacturers must either port all device software to a new platform associated with the required processor or develop software to emulate the new platform on an existing device platform and processor, either of which can involve significant development time and effort.

SUMMARY

A wireless mobile communication device comprises a first processor with which software applications are configured to operate, a second processor configured to manage wireless communication operations, and a communication link between the first and second processors. Optionally, a reliable communications protocol is used for communications between the first and second processors via the communication link to ensure that data sent from either one of the processors is received by the other processor. Further features will be described or will become apparent in the course of the following detailed description.

DETAILED DESCRIPTION

Figure 1:
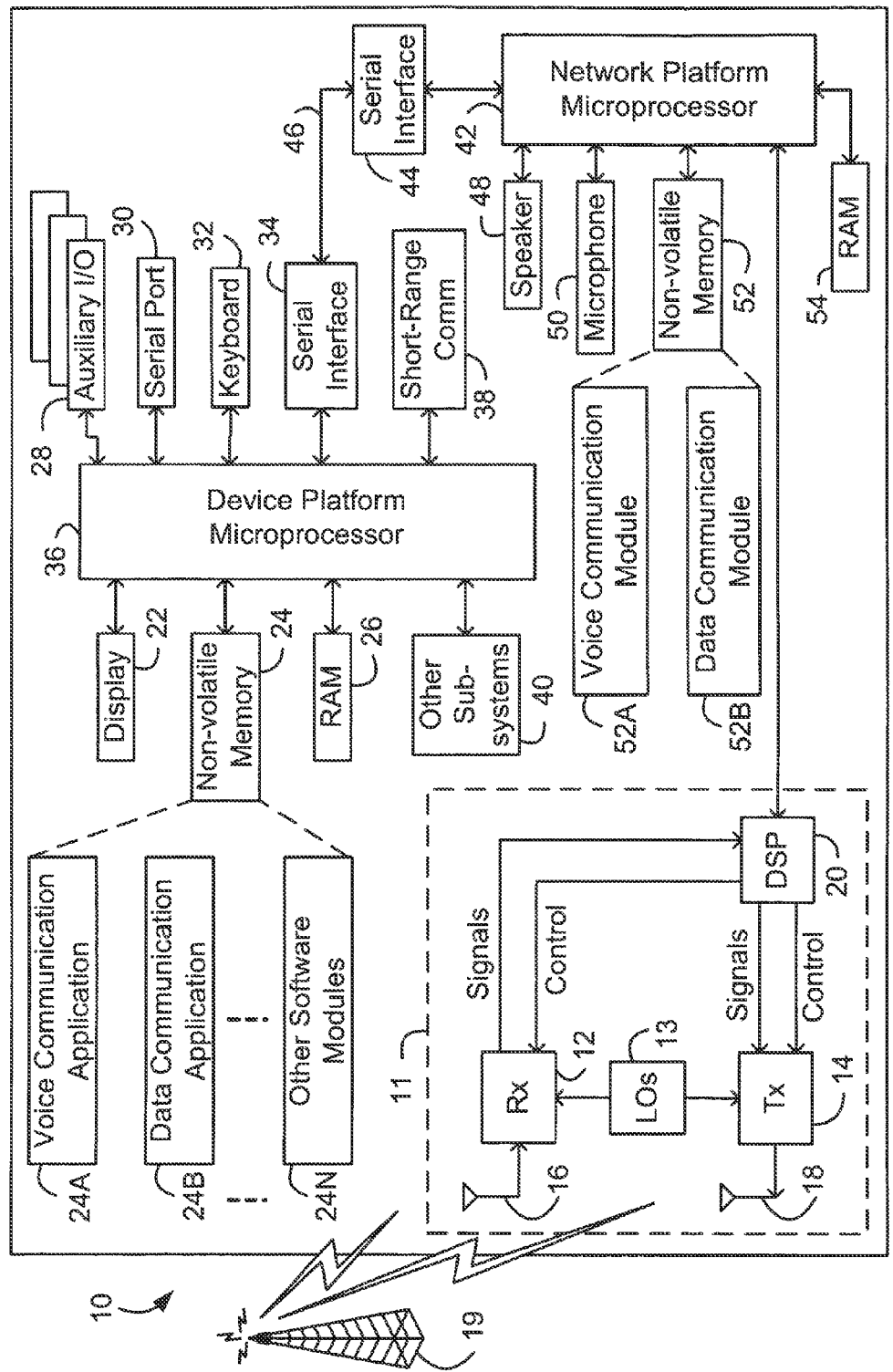
FIG. 1 is a block diagram of a multiple-processor mobile device.

FIG. 1 depicts at 10 a multiple-processor mobile device. The mobile device 10 shown in FIG. 1 is a dual-mode device having both data and voice communication functions. However, it should be appreciated many implementation may be used, such as but not limited to voice-only, data-only or possibly other types of multiple-mode devices, including, for example, cellular telephones, PDAs enabled for wireless communications, one-way and two-way pagers, wireless email devices and wireless modems. The mobile device 10 includes a transceiver 11, a first microprocessor 36, and a second microprocessor 42, as well as components associated with each microprocessor. These components include a display 22, a non-volatile memory 24, a RAM 26, auxiliary input/output (I/O) devices 28, a serial port 30, a keyboard 32, a serial interface 34, and a short-range communications subsystem 38 associated with the first microprocessor 36, as well as a serial interface 44, a speaker 48, a microphone 50, a non-volatile memory 52 and a RAM 54 associated with the second microprocessor 42. Such a device also typically includes other device subsystems shown generally at 40. Although the other device subsystems 40 are shown as being associated with the first microprocessor 36, these subsystems may be associated with either, or possibly both, of the microprocessors 36, 42.

The mobile device 10 is preferably a two-way communication device having voice and data communication capabilities. Thus, for example, the mobile device 10 may communicate over a voice network, such as any of the analog or digital cellular networks, and may also or instead communicate over a data network. The voice and data networks are depicted in FIG. 1 by the communication tower 19. These voice and data networks may be separate communication networks using separate infrastructure, such as base stations, network controllers, etc., or they may be integrated into a single wireless network.

The communication subsystem 11 is used to communicate with the wireless network 19, and includes a receiver (Rx) 12, a transmitter (Tx) 14, one or more local oscillators (LOs) 13, and a digital signal processor (DSP) 20. The DSP 20 sends communication signals to the transmitter 14 and receives communication signals from the receiver 12. In addition to processing communication signals, the DSP 20 also provides for receiver and transmitter control. For example, the gain levels applied to communication signals in the receiver 12 and transmitter 14 may be adaptively controlled through automatic gain control algorithms implemented in the DSP 20. Other transceiver control algorithms could also be implemented in the DSP 20 in order to provide more sophisticated control of the transceiver 11.

If device communications through the wireless network 19 occur at a single frequency or a closely-spaced set of frequencies, then a single local oscillator 13 may be used in conjunction with the transmitter 14 and receiver 12. Alternatively, if different frequencies are utilized for voice communications versus data communications or transmission versus reception, then a plurality of local oscillators 13 can be used to generate a plurality of corresponding frequencies. Although two antennas 16 and 18 are depicted in FIG. 1, the mobile device 10 could be used with a single antenna structure. Information, which includes both voice and data information, is communicated to and from the communication module 11 via a link between the DSP 20 and the second microprocessor 42, as will be described in further detail below. The detailed design of the communication subsystem 11, such as frequency band, component selection, power level, etc., will be dependent upon the wireless network 19 in which the mobile device 10 is intended to operate.

After any required network registration or activation procedures, which may also be different for different communication networks, have been completed, the mobile device 10 may then send and receive communication signals, including both voice and data signals, over the wireless network 19. Signals received by the antenna 16 from the wireless network 19 are routed to the receiver 12, which provides for such operations as signal amplification, frequency down conversion, filtering, channel selection, and analog to digital conversion. Analog to digital conversion of a received signal allows more complex communication functions, such as digital demodulation and decoding, to be performed using the DSP 20. In a similar manner, signals to be transmitted to the network 19 are processed, including modulation and encoding, for example, by the DSP 20 and are then provided to the transmitter 14 for digital to analog conversion, frequency up conversion, filtering, amplification and transmission to the wireless network 19 via the antenna 18.

The first microprocessor 36, labelled as a device platform microprocessor but also referred to herein as the first processor, manages primarily non-communication functions of the mobile device 10, whereas the second microprocessor 42, the network platform microprocessor or second processor, manages communications between the mobile device 10 and the wireless network 19. As described above, some wireless networks 19, such as iDEN, are intended to operate only with a particular processor or type of processor. The multiple-processor arrangement shown in FIG. 1 addresses one or more problems associated with adapting a mobile device for operation on a processor-specific communication network, as will be described in further detail below.

Operating system software used by the first processor 36 is preferably stored in a persistent store such as the non-volatile memory 24, which may be implemented, for example, as a Flash memory or battery backed-up RAM. In addition to the operating system, which controls low-level functions of the mobile device 10, the non-volatile memory 24 includes a plurality of high-level software application programs or modules, such as a voice communication software application 24A, a data communication software application 24B, an organizer module (not shown), or any other type of software module 24N. These modules are executed by the first processor 36 and provide a high-level interface between a user of the mobile device 10 and the mobile device 10. This interface typically includes a graphical component provided through the display 22, and an input/output component provided through an auxiliary I/O 28 and/or the keyboard 32. The operating system, specific device software applications or modules, or parts thereof, may be temporarily loaded into a volatile store such as RAM 26 for faster operation. Moreover, received communication signals may also be temporarily stored to RAM 26, before permanently writing them to a file system located in the non-volatile memory 24 for storing data.

An exemplary software module 24N that may be loaded onto the mobile device 10 is a personal information manager (PIM) application providing PDA functionality, such as calendar events, appointments, and task items. This module 24N may also interact with the voice communication software application 24A for managing phone calls, voice mails, etc., and may also interact with the data communication software application for managing e-mail communications and other data transmissions. Alternatively, all of the functionality of the voice communication application 24A and the data communication application 24B may be integrated into the PIM module.

The non-volatile memory 24 preferably provides a file system to facilitate storage of PIM data items on the device. The PIM application preferably includes the ability to send and receive data items, either by itself or in conjunction with the voice and data communication applications 24A, 24B, via the second processor 42 and the wireless network 19. The PIM data items are preferably seamlessly integrated, synchronized and updated, via the wireless network 19, with a corresponding set of data items stored at or associated with a host computer system, thereby creating a mirrored system for data items associated with a particular user.

The mobile device 10 may also be manually synchronized with a host system by placing the mobile device 10 in an interface cradle, which couples the serial port 30 of the mobile device 10 to the serial port of the host system. The serial port 30 may also be used to enable a user to set preferences through an external device or software application, or to download other application modules 24N for installation on the mobile device 10. This wired download path may be used to load an encryption key onto the mobile device 10, which is a more secure method than exchanging encryption information via the wireless network 19. Other types of wired external interface to the mobile device 10, such as a USB port, may also or instead be provided.

Additional application modules 24N may be loaded onto the mobile device 10 through the wireless network 19, through an auxiliary I/O subsystem 28, through the serial port 30, through the short-range communications subsystem 38, or through any other suitable subsystem 40, and installed by a user in the non-volatile memory 24 or RAM 26. The short-range communications subsystem 38 may, for example, be an infrared device and associated circuits and components such as an Infrared Data Association (IrDA) port, or a short-range wireless communication module such as a Bluetooth™ module or an 802.11 module, to provide for communication with similarly-enabled systems and devices. Those skilled in the art to which the present invention pertains will appreciate that "Bluetooth" and "802.11" refer to sets of specifications, available from the Institute of Electrical and Electronics Engineers (IEEE), relating to wireless personal area networks and wireless local area networks, respectively. Such flexibility in application installation increases the functionality of the mobile device 10 and may provide enhanced on-device functions, communication-related functions, or both. For example, secure communication applications may enable electronic commerce functions and other such financial transactions to be performed using the mobile device 10.

The software modules shown at 24A, 24B and 24N represent device functions or software applications that are configured to be executed by the first processor 36. In most known mobile devices, a single processor manages and controls the overall operation of the mobile device as well as all device functions and software applications, including wireless network communications via the transceiver 11. In the mobile device 10 however, the network platform microprocessor 42, hereinafter referred to primarily as the second processor, is provided to manage network communications. The second processor 42 is a processor required for operation on the wireless network 19. Therefore, a multiple-processor mobile device such as 10 is used when a mobile device incorporating functions and applications that are built on one processor or platform is to be adapted for use on a network such as iDEN, which requires a different processor. A mobile device such as 10 allows such adaptation of a mobile device without having to re-develop existing device functions and software applications for the different processor or emulate the different processor.

Through the serial interfaces 34 and 44 and a serial link 46, the first processor 36 controls the second processor 42 to thereby enable network communication functions for the mobile device 10 on a wireless network 19 on which a device having only the first processor 36 could not normally operate. Communication signals that are received by or to be sent from the mobile device 10 through the transceiver 11 and the wireless network 19 are exchanged between the first processor 36 and second processor 42. Therefore, the mobile device 10 appears to the wireless network 19 to be a network-compatible device, since the required processor (the second processor 42) manages all network communication functions, but may provide enhanced functionality to a user, particularly when the first processor 36 is a more powerful processor than the second processor 42.

The second processor 42 also interfaces with other device components in addition to the transceiver 11. Voice and data communication software modules 52A and 52B, resident in the non-volatile memory 52, provide communication functionality according to network requirements. The RAM 54 is implemented in the mobile device 10 for temporary storage of received communication signals, program data and the like. The speaker 48 and microphone 50 provide inputs and outputs for voice communications. Since the second processor 42 manages network communications, it is most practical to implement the speaker 48 and the microphone 50 to interface with the second processor 42. For an iDEN device, for example, those skilled in the art will appreciate that the second processor 42, an iDEN processor, has its own set of functions, including voice communications capabilities. Other functions of the second processor 42 could also similarly be retained if needed. Moreover, a base device with a processor 36 may also have a rich feature set, such that many of the features associated with typical implementations of the second processor 42 would not be required. In some multiple-processor dual-mode devices, the speaker 48 and microphone 50 could be configured for operation with the first processor 36 instead of the second processor 42. Thus, the second processor 42 manages at least communication functions and may optionally provide other functions.

When the mobile device 10 is operating in a data communication mode, a received signal, such as a text message or a web page download, is processed by the transceiver 11 and provided to the second processor 42, which may further process the received signal, possibly store the received signal to the RAM 54 or the non-volatile memory 52, and forward it to the first processor 36 through the serial link 46 and interfaces 44 and 34. Those skilled in the art will appreciate that in packet-based networks, communication signals are broken into one or more packets for transmission. Each received packet in a particular data communication operation is preferably forwarded to the first processor 36 as it is received.

The first processor 36 may then process a received signal or packets for output to the display 22 or alternatively to an auxiliary I/O device 28, and possibly store the received signal or packets or processed versions thereof in the RAM 26 or the non-volatile memory 24. A user of the mobile device 10 may also compose data items, such as email messages, for example, using the keyboard 32, which is preferably a complete alphanumeric keyboard laid out in the QWERTY style, although other styles of complete alphanumeric keyboards such as the known DVORAK style may also be used. User input to the mobile device 10 is preferably further enhanced with the auxiliary I/O devices 28, which may include such input devices as a thumbwheel input device, a touchpad, a variety of switches, a rocker input switch, etc. The composed data items input by the user are then sent to the second processor 42 over the serial link 46 and then transmitted over the wireless network 19 via the transceiver 11. Outgoing communication signals are stored by either the first processor 36 (in the non-volatile memory 24 or the RAM 26), the second processor 42 (in the non-volatile memory 52 or the RAM 54), or possibly both.

When the mobile device 10 is operating in a voice communication mode, its overall operation is substantially similar to the data mode, except that communication signals are processed primarily by the second processor 42. Received signals are output to the speaker 34 and voice signals for transmission are generated using the microphone 36. However, alternative voice or audio I/O subsystems, such as a voice message recording subsystem, may also be implemented on the mobile device 10 and associated with either the first processor 36 or the second processor 42. Although voice or audio signal output is preferably accomplished primarily through the speaker 34, the display 22 may also be used to provide an indication of the identity of a calling party, the duration of a voice call, or other information related to voice calls. For example, the second processor 42 may be configured to detect caller identification information for an incoming call and to send the information to the first processor 36 via the serial link 46. The first processor 36 then processes the caller identification information and displays it on the display 22.

Operation of the mobile device 10 will now be described in further detail in the context of an illustrative of example of an iDEN mobile device, where the second processor 42 is an iDEN processor.

Radio Application Layer Protocol (RALP) is one protocol that may be used to control the iDEN radio protocol stack from outside an iDEN mobile device, allowing one to turn a device transceiver on and off, begin and end calls, and the like. Currently, iDEN devices accept RALP packets using the BISYNC protocol, or alternatively using User Datagram Protocol over Internet Protocol (UDP/IP). Those skilled in the art will be familiar with both these protocols. Normally, one connects to an iDEN mobile device using Point-to-Point Protocol (PPP), an open protocol used when sending packets from one side of a serial link to the other, and then RALP commands are sent over UDP/IP to the iDEN mobile device.

This known UDP/IP configuration is not always suitable for control data on mobile devices. For example, UDP/IP is not reliable. PPP packets have a checksum, which results in rejection of any malformed or damaged packets for which the checksum is not verified. Therefore, packets that are sent at one end of a serial link over PPP either make it up to the UDP/IP layer at a receiving end exactly as they were sent, or they are rejected and do not arrive at the receiving end UDP/IP layer at all. However, there is no provision for the sending side to determine that a packet was malformed when it was received, or that it should be resent for some other reason. RALP packets must generally arrive at their destination intact.

In addition, UDP/IP requires an IP address. An IP packet requires both a sending and receiving IP address to be specified. UDP also adds a sending port and a receiving port to these packets. A primary problem in this situation is that it is often desirable to establish a RALP communication link even when neither side has been yet assigned an IP address.

Furthermore, UDP/IP has no packet-level flow control. Because UDP/IP was designed as an unreliable so-called "fire and forget" protocol, it makes no provisions for flow control, that is, the stopping and restarting of a flow of packets from a sender when the receiver runs out of buffer space for the incoming packets. This is disadvantageous for mobile device control, where all RALP packets should arrive at their destination.

Although UDP/IP transport of RALP packets is already implemented in iDEN mobile devices, it provides, for the reasons above, drawbacks for a multiple-processor mobile device.

One possible alternative to UDP/IP would be to transport data via Transfer Control Protocol (TCP) over IP. TCP/IP is a reliable protocol which addresses two of the issues above. It is reliable, so there is little chance of packets not getting through, and this reliability means that packets that cannot be buffered at a receiving end can simply be discarded or dropped, since they will be sent again if they are not processed by the receiver.

However, TCP/IP also has some inherent disadvantages. TCP/IP, like UDP/IP, requires IP addresses. Although reliable, TCP/IP is relatively inefficient. A header of a TCP/IP packet is typically 40 bytes long. Almost all of this information is irrelevant to a RALP connection, and an inefficient protocol is particularly undesirable on a serial link, which has rather limited throughput. Header compression techniques may reduce header length and thus improve transfer efficiency, but requires rather complex software code at both ends of the connection. Such a solution would not be feasible for a serial link within mobile devices however, since both processing resources and memory space available for software code is typically limited.

TCP/IP may also be too all-encompassing for implementation on a mobile device. The serial connection between processors on a mobile device such as shown in FIG. 1 should have a reliable transport of RALP packets from one serial port or interface to another. For example, for such connections, there is no need for such TCP features as 32-bit packet sequence numbers, a checksum of the packet payload (since PPP already performs this), or separation of urgent packets from normal ones. Moreover, TCP/IP is designed as a streaming protocol which assumes that the data that it is sending is a continuous stream of bytes which may be interrupted anywhere, divided into packets, and then sent. Since RALP already processes its data into packets, this represents extreme redundancy for a simple packet transport system. TCP/IP is an excellent and widely used protocol for Local and Wide Area Network (LAN and WAN) and Internet applications, but was never intended for transport of pre-packetized data over a short serial link.

There is currently no acceptable reliable way to send RALP packets over PPP. Part of the reason for this is that RALP has primarily been used as a testing protocol, rather than as an integral part of any product's functionality. Additionally, serial links are normally thought of as completely reliable. This approach could prove disastrous if RALP packets are dropped or corrupted in a system where RALP is used for important transactions. In the mobile device 10, wireless network communications are dependent upon reliable transfer of control data from the first processor 36 to the second processor 42 over the serial link 46. For example, if a long distance telephone call is initiated using the keyboard 32 or an auxiliary input device 28 and the voice communication software application 24A running on the first processor 36, then the actual wireless network communications are managed by the second processor 42. When a call end command is issued from the first processor 36 to the second processor 42, then it is imperative that the command be reliably transferred to the second processor 42. Many other situations in which command or data transfer between processors is crucial will be apparent to those skilled in the art. Reliable inter-processor control communications are therefore essential for multiple-processor mobile devices.

One alternative novel protocol intended for transfer of control data over the serial link between processors in a multiple-processor mobile device is described in detail below. This protocol is referred to herein as RRP, for the Reliable RALP Protocol. Another related new protocol, also described below, is RRPCP, for the RRP Configuration Protocol, which sets up a PPP link to accept RRP packets.

In general, RRP uses a system of packet sequence numbers and acknowledgements to ensure reliable transport of RALP packets in both directions on a serial link. It uses as little overhead as possible on the serial link, to maximize throughput. It also allows application data, such as user emails associated with a data communication application 24A on a mobile device 10, to be transmitted via UDP/IP in parallel with RRP. Although, as described above, UDP/IP is not suitable for transfer of important control data between processors, it may be used to transfer user data, which will be transferred from a mobile device over the air through the wireless network 19. Since the over-the-air link already provides a UDP/IP layer, inter-processor transfer of user data via UDP/IP provides for a simpler overall device architecture and operation. Thus, data from the wireless network 19 that arrives at the mobile device 10 is already packaged as UDP/IP packets and data to be sent over the wireless network 19 is similarly formatted as UDP/IP packets for serial link transfer on the mobile device 10. Also, the lack of reliability of UDP/IP is less important for user data, because wireless networks are inherently unreliable. Higher-level protocols on a mobile device generally handle user data transfer reliability concerns such as packet loss and the like. For user data, the additional measures required to improve the reliability of data transfer on the device itself is seldom justified, given that the data was or will eventually be transferred over an inherently unreliable network. Thus, RRP is used to control radio functions, while the actual data to be sent over the air is sent via UDP/IP. These two protocols share the PPP inter-processor link.

In order to provide for packet error checking, the checksum function provided by PPP is considered sufficient since physical layer errors on the serial link are expected to be infrequent and single-bit-per-frame in nature. However, the problem of corrupted packet rejection in standard PPP is addressed in RRP by using a packet sequence number and packet acknowledgements to allow a sender to ensure receipt of packets. Various flags may be defined for RRP packets and will be described in further detail below. The sync byte provided by PPP is also preferably retained in RRP, since framing may otherwise be lost.

Figure 2:
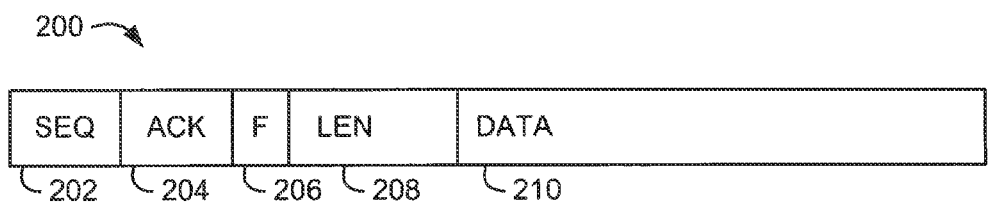
FIG. 2 is a data format diagram showing a data packet for communication between multiple processors on a mobile device.

FIG. 2 is a data format diagram showing a data packet used for communication between multiple processors on a mobile device, according to RRP. As shown, an RRP packet 200 preferably includes a sequence number (SEQ) 202, an acknowledgement number (ACK) 204, one or more flags (F) 206, a length field (LEN) 208 and data 210.

The sequence number 202 is a number assigned to each packet transmitted over the serial link between processors. Initialization of the sequence number 202 to 0 at the beginning of a connection allows a relatively short sequence number, preferably 1 byte, to be used. The sequence number 202 is preferably incremented by 1 for each transmitted RRP packet. Any time an RRPCP packet (described below) is sent or received to configure RRP, the connection is restarted, and SEQ is re-initialized to 0. Although 0 is a preferred initial value of SEQ, other values may instead be used without departing from the invention. Increments of other than 1 may similarly be used.

When an RRP packet is sent to acknowledge receipt of a packet, the ACK field 204 is the sequence number of the packet being acknowledged. The ACK field 204 is valid if an appropriate flag is set in the packet to indicate that the packet is an acknowledgement packet. Otherwise, ACK field 204 is preferably ignored and therefore may remain uninitialized.

The flags 206 in an RRP packet preferably include at least 4 one-bit flags. A reliable-packet flag indicates that certain actions must be performed at a receiving end of a link. An acknowledgement flag indicates that the packet is a packet receipt acknowledgement packet, and that the ACK field 204 is present and valid. These two flags enable a basic implementation of RRP. Since other flags may also be useful as RRP is further developed, additional flags are preferably provided and reserved for future use. With 4 flag bits in a preferred RRP packet 200, two reserved flags are available.

The length field 208 indicates the length, in bytes, of the data field 210 in the RRP packet 200. This is an additional data integrity check, in case some bytes are dropped and the packet still passes the PPP checksum. Since the longest possible PPP data field is 1500 bytes, and the longest packet payload length for a RALP packet is 1472 bytes when transported over IP, a reasonable maximum length setting for RRP packets is 1472 bytes. Where connection configuration negotiation is possible, larger payload lengths may be supported. Although the maximum length of 1472 may be specified in less than 12 bits, a 12-bit length field, in combination with the other RRP packet fields, provides a packet having a length of a whole number of bytes. A 12-bit length field also supports packets having longer payloads without requiring any change to packet formatting.

The data field 210 contains the payload of the packet. An empty data field 210 is preferably valid. This data is treated by RRP as opaque; any escaping of characters is done by a layer below RRP.

It should be appreciated that the RRP packet 200 is provided for illustrative purposes only. For example, additional packet fields and flags may be defined as required, the lengths and order of packet fields shown in FIG. 2 may be changed.

RRP may also make use of further mobile device resources. Timers and counters are preferably implemented to provide additional reliability for RRP. Where delayed receiving end acknowledgement is desired, a delayed acknowledgement timer is preferably established. As described in further detail below, delayed acknowledgement may be useful in reducing the number of acknowledgement packet transmissions. A retransmit timer is also preferably provided so that sent packets which have not been acknowledged after a certain period of time are retransmitted by a sender. Where delayed acknowledgement is used, it should be apparent that the retransmit timer must be set for a longer time period than the delayed acknowledgement timer. A packet retransmission counter may also be used to ensure that a mobile device does not sit in a frozen state, in which packets are repeatedly retransmitted and not acknowledged, for a long time. Such timers and counters are preferably configured to operate in conjunction with coefficients that may be reset from time to time. Delayed acknowledgement time, retransmit time and a maximum retransmission count might be established in software variables stored in a memory at each end of a link over which RRP is to be used, such that processors at each end of the link access and use the same time and count settings. Time and count values may then be changed by resetting the stored variables to different values.

Figure 3:
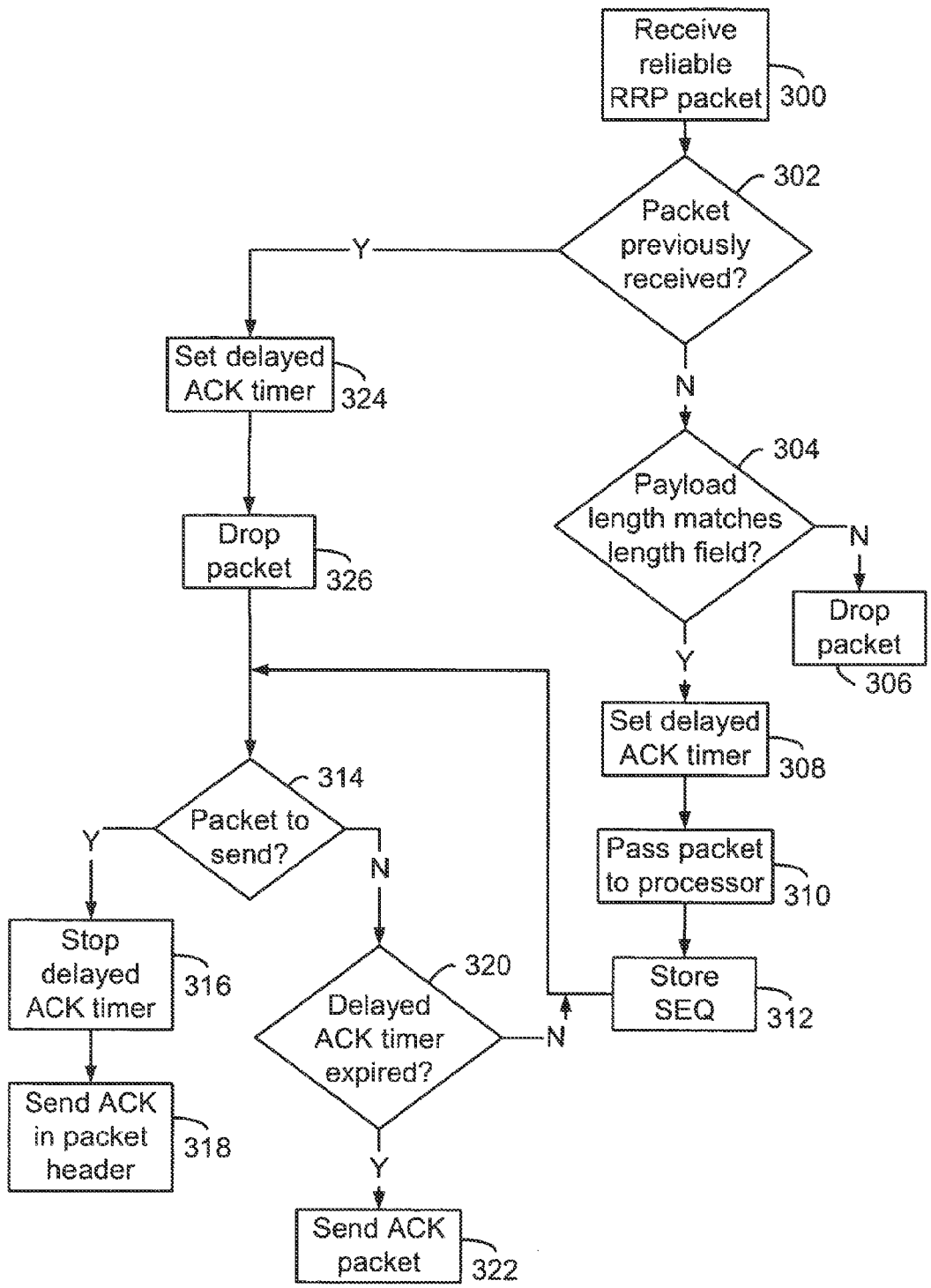
FIG. 3 is a flow diagram illustrating a method of processing received packets.
Figure 4:
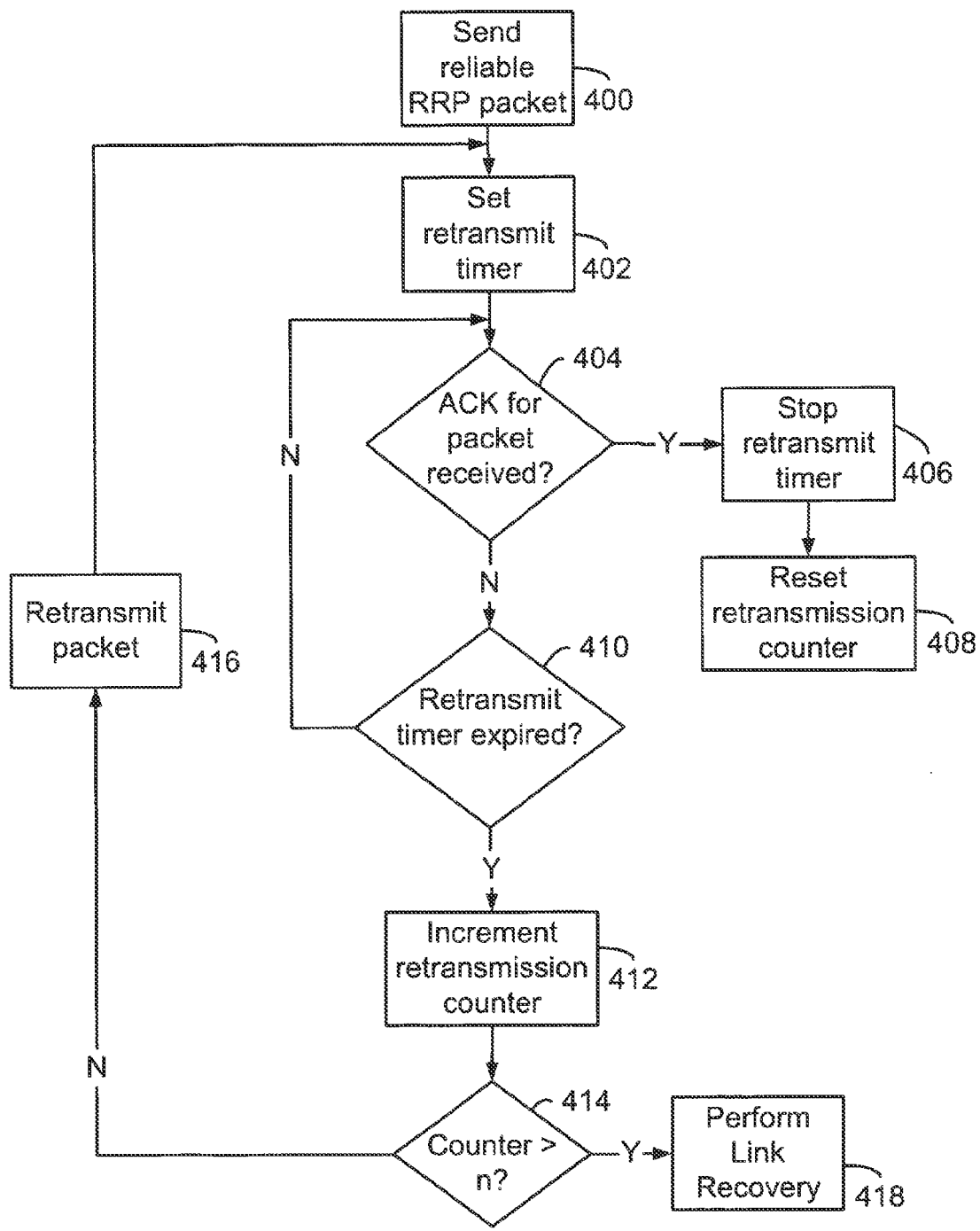
FIG. 4 is a flow diagram showing a method of sending packets.

Methods of receiving and sending RRP packets are described below in the context of an illustrative example and with reference to FIGS. 3 and 4. FIG. 3 is a flow diagram illustrating a method of processing received packets, and FIG. 4 is a flow diagram showing a method of sending packets.

In FIG. 3, when a reliable RRP packet X, indicated by the reliable-packet flag described above, is received at a receiving end of a link at step 300, the receiver checks the sequence number to determine whether packet X has been received before, at step 302. If not, then the receiver checks the length of the data field 210 to confirm that it is consistent with the length field 208, at step 304. If not, then packet X is in error and is dropped by the receiver at step 306. In RRP, a dropped packet will be retransmitted as described below, so it is safe for the receiver to drop packets. If the length of the data field 210 matches the length specified in the length field 208, then the receiver preferably sets its delayed acknowledgement timer at step 308 and forwards the packet X payload to the processor at the receiving end of the link, at step 310. At step 312, the receiver stores the sequence number of packet X, in a RAM such as 26 or 54 shown in FIG. 1, for example.

If the receiving end has an RRP packet to send while the delayed acknowledgement timer is active, as determined at step 314, the timer is stopped at step 316 and the acknowledgement for packet X is sent in the header of this new packet at step 318, by setting the acknowledgement flag and including the stored sequence number of packet X in the ACK field of the new packet. The use of a delayed acknowledgement timer thereby avoids transmission of a separate acknowledgement packet if the receiver sends a packet during the delayed acknowledgement time and thus may reduce traffic on the link. Otherwise, upon the expiry of the delayed acknowledgement timer, detected at step 320, the receiver sends an acknowledgement packet with only the sequence number of packet X and the ACK flag set in the packet header, at step 322. Acknowledgement packets preferably include no data (the length field is 0) in order to keep such packets small. In addition, the reliable-packet flag is preferably not set in acknowledgement packets, since no acknowledgement is expected for an acknowledgement packet. A receiver monitors for either a new packet to be sent or expiry of the delayed acknowledgement timer in steps 314 and 320.

If the original sender of packet X does not receive the acknowledgement packet for packet X, it will retransmit X as described in detail below. The original receiver that acknowledged packet X must then detect that a packet with this sequence number has already been received, at step 302, and will issue another acknowledgement. This acknowledgement, as above, may be a standalone acknowledgement packet or it may piggyback on another packet to be sent, provided that the delayed acknowledgement timer is set at step 324 before the packet is dropped at step 326. Thus, the sequence number of a received packet is preferably stored until a new RRP packet with a different sequence number is received, such that duplicate packets can be detected and dropped at a receiver. Acknowledgement of a duplicate packet proceeds at step 314 as described above, after the packet is dropped at step 326.

The receiver of packet X may itself send RRP packets regardless of how many retransmissions of packet X are made. The sequence number for packet X may be placed in the ACK field 204 of multiple different packets sent by the receiver.

Referring now to FIG. 4, when a reliable RRP packet X (with sequence number SEQ) is sent by a sender at step 400, the sender sets its retransmit timer at step 402. This timer is stopped when an RRP packet with the acknowledgement flag set and packet X's sequence number in the ACK field is received at step 404. As described above, a receiver of packet X preferably stores the sequence number of packet X until another packet with a different sequence number is received. Therefore, in one embodiment of the invention, the sender may not transmit another reliable RRP packet until an acknowledgement for packet X has been received. When an acknowledgement for packet X is detected at step 404, the retransmit timer is stopped at step 406 and the retransmission counter (described below), if provided, is reset at step 408.

Each time expiry of the retransmit timer is detected at step 410, the retransmission counter, if provided, is incremented at step 412. If the retransmission counter is not above some maximum number, n, indicating that the same packet has been sent n times without an acknowledgement that the packet has been received (step 414), then the sender retransmits packet X at step 416 as originally transmitted, with the same sequence number, flag settings, ACK number, length and data fields. If it is determined at step 414 that the retransmission counter exceeds n, then link recovery procedures are preferably performed at step 418, as described in further detail below.

The above procedures also remove any need for flow control over a link using RRP. If a receiver does not have sufficient buffer space for a packet X sent by a sender, then packet X may be safely dropped by the receiver. The receiver can drop packet X since the sender will retransmit packet X when its retransmit timer expires, as described above.

Also, since duplicate packets are detected and dropped at a receiver and acknowledgements require no response from a sender of the packet being acknowledged, RRP also provides for a benign link probe. A link probe may be performed by retransmitting a previously-sent RRP packet. If a sender resends a packet X, then the receiver will simply drop packet X, reissue the ACK for X, and take no further action. Alternatively, an RRP packet with an empty data field is used to perform a benign link probe. Since the data field is empty, a receiver issues an ACK in response to such a packet, but no further data processing operations are required.

When either side has an RRP packet to send, assuming that there are no outstanding acknowledgements or retransmissions pending, it simply inserts the current sequence number into SEQ, sets the reliable-packet flag, clears the ACK flag, puts the length of the payload into the length field, sets its retransmit timer and sends the packet to PPP to be sent. ACK handling is performed as described above.

If a packet is not acknowledged after n attempts, then one of the processors in a mobile device, preferably a device platform processor 36 as shown in FIG. 1, closes and re-opens the PPP link as described below. This interrupts any UDP and RRP communications (along with any RALP communications) active on the link. If the link cannot be restarted, then a fatal error is preferably issued. The status of a link may be determined even when there has not been traffic on the link for a significant period of time by performing a link probe. For example, one of the mobile device processors may be configured to probe the link as described above after a certain period of inactivity on the link. If some sort of link failure has occurred, then the normal link recovery procedures are initiated after the retransmission count for the probe packet reaches the maximum.

PPP is preferably configured for RRP using RRPCP. At present, a preferred format for an RRPCP packet is the same as for Link Control Protocol (LCP) and IP Control Protocol (IPCP). These protocols are discussed only briefly below, since further details on these protocols can be found in RFC 1661 and RFC 1332, respectively.

RRPCP involves transfer of only up to two RRPCP packets by each side of a link—a configure-request packet and a configure-acknowledge packet, each of which has a payload length of zero. Configuration settings are preferably specified in the header of a configure-request packet in order to minimize the amount of data that is transferred to set up RRP.

In a preferred embodiment, each side of a link sends an RRPCP configure-request packet with length 0 to the other side, immediately after PPP has been established, for example. Alternatively, one side of the link initiates RRPCP by sending a first configure-request packet, and the other side sends its own configure-request packet when it receives the first configure-request packet. A protocol identifier field of an RRPCP configure-request packet identifies RRPCP, using a suitable protocol identifier. A particular value in a code field of an RRPCP packet is used to indicate that the packet is a configure-request packet. An identifier header field can be used as an identifier for the link or session and is similar to the sequence number described above, in that it provides a reference number for a configure-acknowledge packet. As mentioned above, no payload is sent with an RRPCP configure-request packet, such that a length header field is set to zero. It is also contemplated that certain options may be specified in a RRPCP configure-request packet.

Upon receiving an RRPCP configure-request packet, each side prepares to receive and send RRP packets, preferably initializes SEQ to 0, and responds with an RRPCP configure-acknowledge packet, which is identical to the configure-request packet except for the code field. In order to differentiate between configure-request and configure-acknowledge packets, different values are inserted in the code field. When options are specified in the configure-request packet, the corresponding configure-acknowledge packet might include different options fields, when a receiver of the configure-request packet cannot support all of the options specified in the configure-request packet. This type of exchange is applicable, for example, where link configuration settings are negotiated.

When a party receives an RRPCP configure-acknowledge packet, it can safely assume that it may begin sending RRP packets. Since both sides of the link send a configure-request packet in this embodiment, each side is assured that the other side is ready to receive RRP packets when a configure-acknowledge packet corresponding to its configure-request packet is received. As described above, RRP is used for transfer of control data, whereas another protocol such as UDP/IP may be used for transfer of user data, for example after a "radio on" command is issued by a first processor to a second processor.

In the above example, each side of a PPP link transmits a configure-request packet and a configure-acknowledge packet. In an alternative embodiment, RRP configuration is accomplished with a single configure-request packet from a first side of a link and a single configure-acknowledge packet from a second side of the link. In this case, however, the first side preferably prepares to send and receive RRP packets when it sends the configure-request packet instead of when it receives a configure-request packet, since the second side does not send a configure-request packet. Also, after it sends the configure-acknowledge packet in response to the configure-request packet, the second side of the link assumes that the first side is ready to receive RRP packets, as the first side does not return a configure-acknowledge packet.

A link configuration process using RRPCP is performed when a link is initially configured for RRP, but may also be repeated when a link error is suspected, for example when a sender has retransmitted a reliable RRP packet, including a packet sent to probe the link, the maximum number of times without receiving an acknowledgement for the packet. When an RRP link is reconfigured, the existing link is first torn down. In a preferred embodiment, RRPCP also supports a terminate-request packet and a terminate-acknowledge packet. One side of an existing RRP link sends a terminate-request packet to the other side to terminate the link. Upon receiving a terminate-request packet, the other side returns a terminate-acknowledge packet, and each side of the link tears down its respective RRP connection. A new RRP link is then configured as described above. It should also be appreciated that each side of an RRP link may send a terminate-request packet and a terminate-acknowledgement packet In an alternative embodiment, an existing RRP link is torn down whenever an RRPCP configure-request packet is received, and RRP configuration then proceeds as described above.

It will be appreciated that the above description relates to preferred embodiments by way of example only. Many variations on the invention will be obvious to those knowledgeable in the field, and such obvious variations are within the scope of the invention as described, whether or not expressly described.

For example, although described in the context of a stand-alone mobile device, the techniques described herein may be applied to other types of wireless communication devices, such as wireless modems which typically operate in conjunction with a computer system or other device. In addition, aspects of the invention have been described above for a serial link between processors. Alternative possible implementations to accomplish inter-processor control may include separate dedicated lines connected between the processors, wherein a single line is used for each control function, to start/end a call, and to activate/deactivate radio, for example, to be supported. Further possible implementations to which the invention is applicable include a shared memory system in which commands are written by one processor into a shared memory space and read out by the other processor. In this type of implementation, command acknowledgements and user data are also written to and read from the memory in a similar manner. A shared inter-processor bus, in which commands and responses are placed on the bus, is another alternative to the serial link described above.

Figure 5:
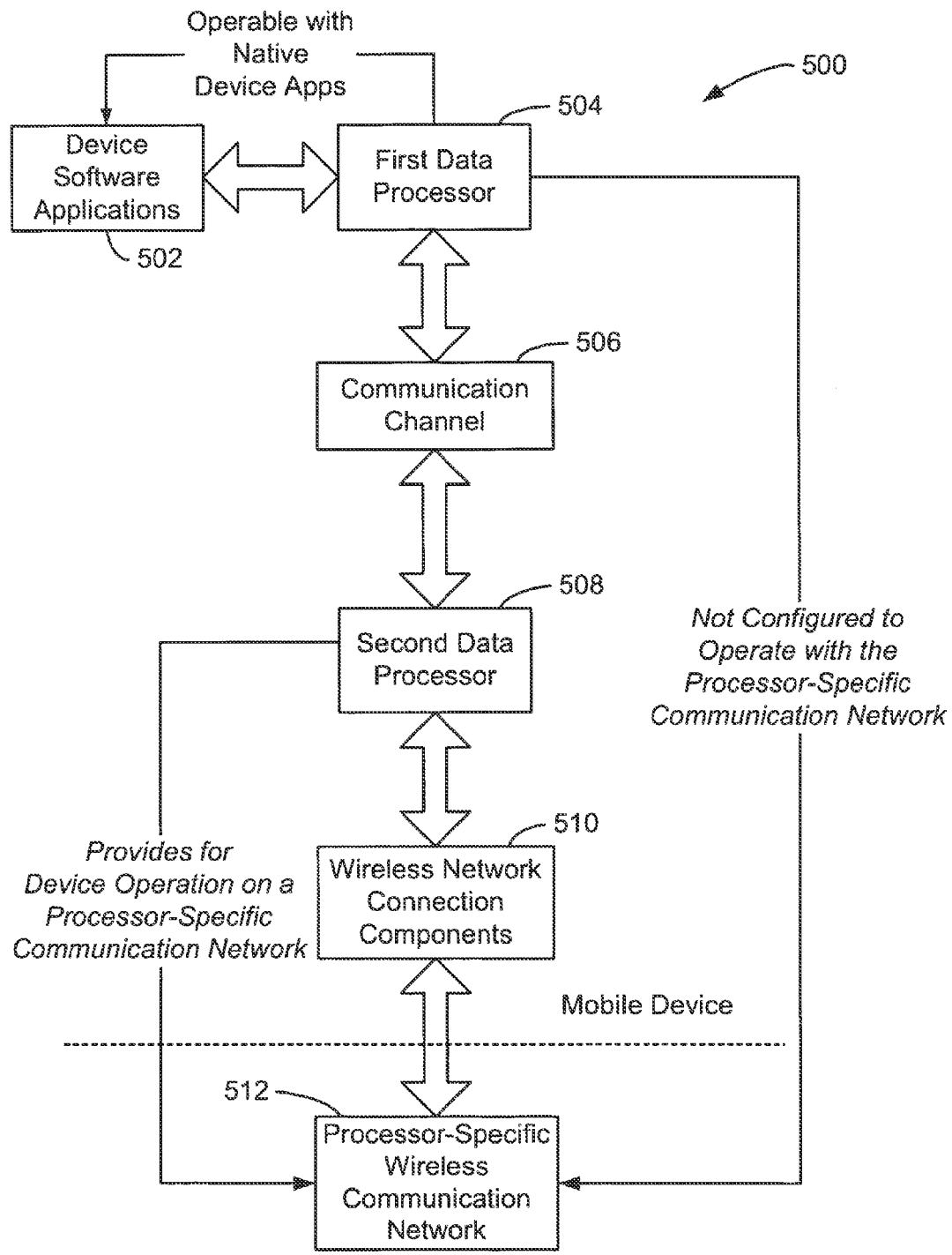
FIGS. 5-7 are block diagrams depicting system-level components of a multiple-processor mobile device.
Figure 6:
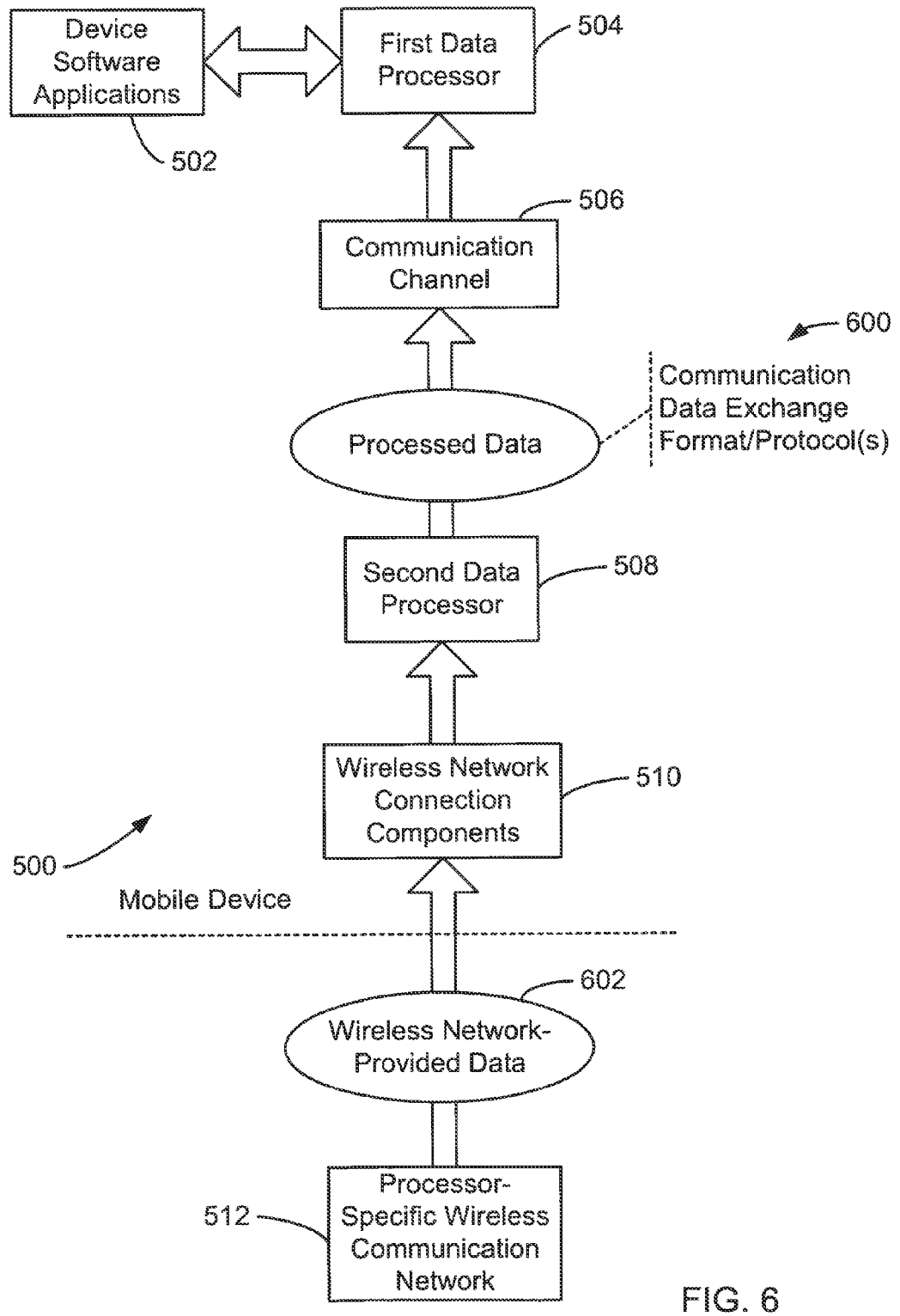
Figure 7:
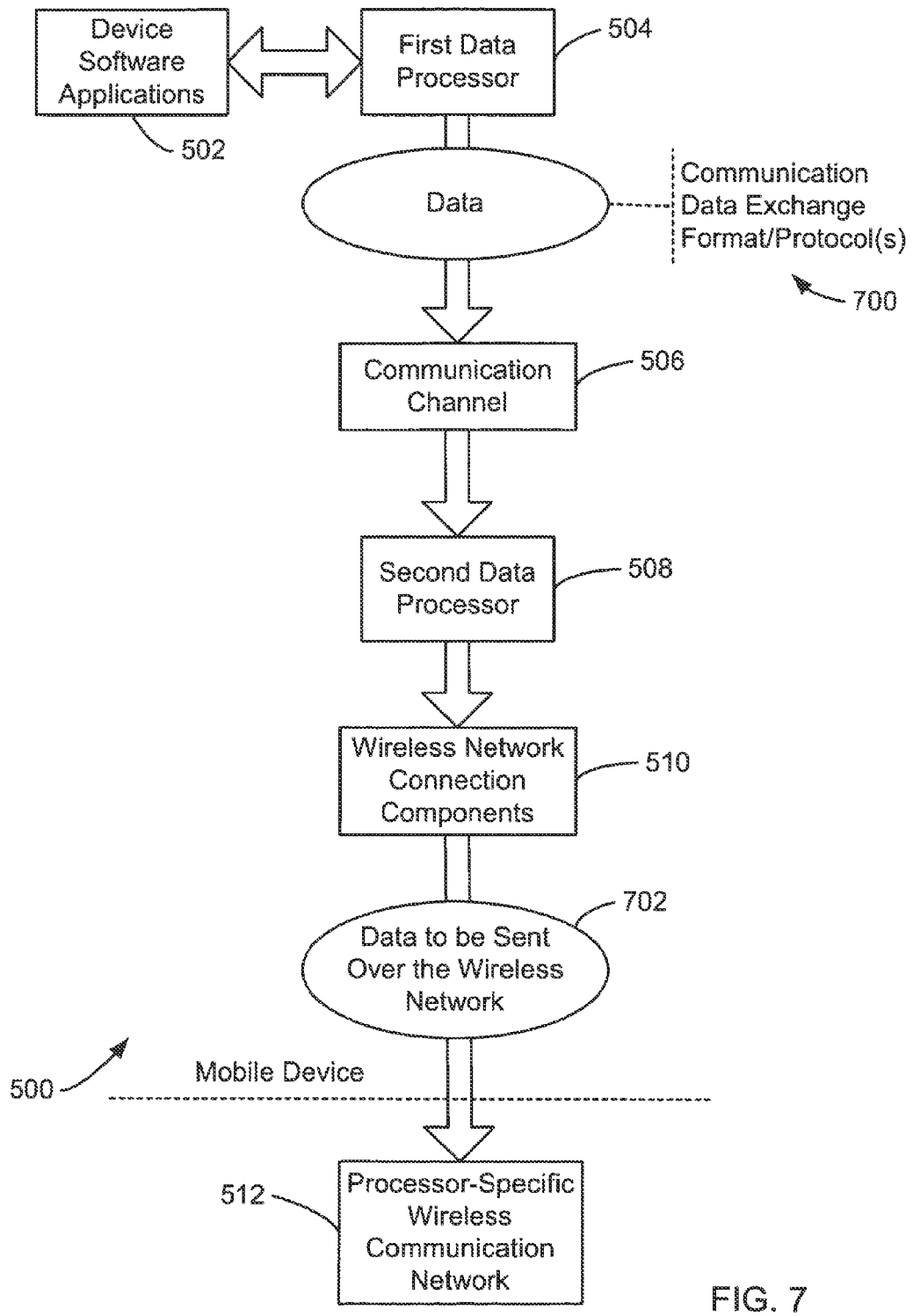

As yet another example of the broad applicability of the systems and methods disclosed herein, FIGS. 5-7 depict components of a multiple-processor mobile device 500. As shown in FIG. 5, multiple processors (504 and 508) operate within the mobile device 500, wherein the mobile device 500 is capable of data communications over a wireless network 512. The first data processor 504 is configured to be operable with at least one native mobile device software application 502, such as a personal information manager application. The second data processor 508 is configured to process data received from or to be sent over the wireless network 512. The first data processor 504 has a configuration such that the first data processor 504 is not operable with the wireless network 512 because the wireless network 512 requires a preselected data processor type, such as the second data processor 508.

A data communication channel 506 is disposed between the first data processor 504 and the second data processor 508 so that communication data signals that are received by or to be sent from the mobile device 500 through the wireless network 512 are exchanged between the first data processor 504 and second data processor 508 through the data communication channel 506. Such a system allows for device operation on a processor-specific communication network 512 through use of the second data processor 508 while maintaining a native device software platform through use of the first data processor 504. The wireless network connection components 510 include either or both of a receiver and a transmitter compatible with the wireless network 512.

With reference to FIGS. 6 and 7, different communication protocols may be used in the exchange of data (600 and 700) between the data processors (504 and 508). For example, a communication protocol may be used wherein the communication protocol comprises a first communication protocol to control radio functions of the mobile device 500 and a second communication protocol to handle data received from or to be sent over the wireless network 512. It is noted that the second data processor 508 may perform a substantial amount of processing upon the data 602 received from the wireless network 512 or may perform little or no processing upon the data 602. The situation at hand may dictate how much processing is performed.

The invention claimed is:

1. A mobile communication device comprising:
    a network platform processor configured to communicate with a particular wireless communication network; and
    a device platform processor that is not compliant with the particular wireless communication network and that is configured to:
        generate control data and messages;
        send, using a Transfer Control Protocol over Internet Protocol (TCP/IP), the control data to the network platform processor to control operation of the network platform processor; and
        send, using a User Datagram Protocol over IP (UDP/IP), the messages to the network platform processor for the network platform processor to wirelessly transmit the messages over the particular wireless communication network.

2. The mobile communication device of claim 1 wherein the TCP/IP employs packet sequence numbers and acknowledgements, and the UDP/IP employs neither packet sequence numbers nor acknowledgements.

3. The mobile communication device of claim 2 wherein the network platform processor is configured to, after receiving the control data, delay sending an acknowledgement in order to send the acknowledgement within a data packet to be sent to the device platform processor.

4. The mobile communication device of claim 1 wherein the TCP/IP is also used by the network platform processor for transmitting the messages over the particular wireless communication network.

5. The mobile communication device of claim 1 wherein the particular wireless communication network is an iDEN network.

6. The mobile communication device of claim 1 wherein the sending of the control data and the sending of the messages is through a wired serial link within the mobile communication device.

7. The mobile communication device of claim 1 further comprising a transceiver configured to wirelessly receive text data from the network and forward the text data to the network platform processor, and the network platform processor is configured to forward the text data to the device platform processor, and the device platform processor is configured to output the text to a display.

8. The mobile communication device of claim 1 wherein the device platform processor is configured to receive the messages from a keyboard of the mobile communication device.

9. The mobile communication device of claim 1 wherein the TCP/IP includes sending data a first time, and resending the data if an acknowledgement of the sent data is not received within a retransmit time.

10. The mobile communication device of claim 1 wherein the TCP/IP includes initiating data communication channel recovery operations if the data has been resent a predetermined number of times without an acknowledgement being received.

11. A method performed by a device platform processor of a mobile communication device for communicating with a network platform processor of the mobile communication device, the network platform processor being configured to communicate with a particular wireless communication network, and the device platform processor being noncompliant with the particular wireless communication network, the method comprising:
  generating control data and messages;
  sending, using a Transfer Control Protocol over Internet Protocol (TCP/IP), the control data to the network platform processor to control operation of the network platform processor; and
  sending, using a User Datagram Protocol over IP (UDP/IP), the messages to the network platform processor for the network platform processor to wirelessly transmit the messages over the particular wireless communication network.

12. The method of claim 11 wherein the TCP/IP employs packet sequence numbers and acknowledgements, and the UDP/IP employs neither packet sequence numbers nor acknowledgements.

13. The method of claim 12 wherein the network platform processor is configured to, after receiving the control data, delay sending of an acknowledgement in order to send the acknowledgement within a data packet to be sent to the device platform processor.

14. The method of claim 11 wherein the TCP/IP is also used by the network platform processor for transmitting the messages over the particular wireless communication network.

15. The method of claim 11 wherein the sending of the control data and the sending of the messages is through a wired serial link within the mobile communication device.

16. The method of claim 11 further comprising:
  a transceiver wirelessly receiving text data from the network and forwarding the text data to the network platform processor;
  the network platform processor forwarding the text data to the device platform processor;
  the device platform processor outputting the text data to a display; and
  the device platform processor receiving the message from a keyboard of the mobile communication device.

17. The method of claim 11 wherein the TCP/IP includes sending data a first time, and resending the data if an acknowledgement of the sent data is not received within a retransmit time.

18. The method of claim 11 wherein the TCP/IP includes initiating data communication channel recovery operations if the data has been resent a predetermined number of times without an acknowledgement being received.

* * * * *